United States Patent
Matsumoto

Patent Number: 5,535,295
Date of Patent: Jul. 9, 1996

[54] COUPLING STRUCTURE FOR WAVEGUIDE CONNECTION AND PROCESS OF FORMING THE SAME

[75] Inventor: Kiyoto Matsumoto, Tokyo, Japan

[73] Assignee: NEC Corporation, Tokyo, Japan

[21] Appl. No.: 329,452

[22] Filed: Oct. 26, 1994

[30] Foreign Application Priority Data

Oct. 28, 1993 [JP] Japan .................................. 5-271048

[51] Int. Cl.6 ...................................................... G02B 6/30
[52] U.S. Cl. .............................................. 385/49; 385/55
[58] Field of Search ................................. 385/49, 50, 55, 385/56, 88, 98, 139

[56] References Cited

U.S. PATENT DOCUMENTS

| | | | |
|---|---|---|---|
| 4,247,164 | 1/1981 | Mannschke | 385/83 |
| 4,715,674 | 12/1987 | Schulz et al. | 385/70 |
| 5,123,068 | 6/1992 | Hakoun et al. | 385/49 |
| 5,359,686 | 10/1994 | Galloway et al. | 385/49 |

FOREIGN PATENT DOCUMENTS 350510  5/1991  Japan .

OTHER PUBLICATIONS

"Development of Silica Based Guided–Wave 1X16 Splitter Module"; no month 1992; Electronics/Information/Communication Institute; #C–186 in Japanese.

*Primary Examiner*—Rodney B. Bovernick
*Assistant Examiner*—Robert E. Wise
*Attorney, Agent, or Firm*—Whitham, Curtis, Whitham & McGinn

[57] ABSTRACT

A simplified, suitable-to-mass-production and high-reliable coupling structure for connection between optical waveguides or between an optical waveguide and an optical fiber is provided. A tenon is formed at the end of a substrate on which an optical waveguide is formed and a groove is formed on the end portion of another substrate on which an optical waveguide is formed. These optical waveguides are connected by fitting the tenon into the groove. By placing an optical fiber instead of an optical waveguide on the grooved substrate, an optical waveguide and an optical fiber can be connected. The tenon and the groove are formed using mass-production with high precision by performing chemical anisotropic etching using a mask pattern formed at the end portion of each substrate.

12 Claims, 6 Drawing Sheets

COUPLING STRUCTURE FOR WAVEGUIDE CONNECTION AND PROCESS OF FORMING THE SAME

BACKGROUND OF THE INVENTION

This invention relates to a coupling structure for connection between waveguides or between a waveguide and an optical fiber formed on respective substrates, and relates to a process of forming the coupling structure.

It is easy for optical waveguides to integrate the optical branching and linking functions and the optical synthesis and dissolution functions, and to link with optical semiconductor elements. In addition, downsizing and lower price, because of their advantage of being superior in mass-production, can be expected. To apply optical waveguides to devices for the optical-fiber communication, connection between optical waveguides and optical fibers is essential. Also for making effective use of the characteristic of the optical waveguides, a simple, high-reliable coupling structure for connection between an optical waveguide and an optical fiber is needed. Furthermore, to build a large-scale integrated circuits, there can occur some cases where waveguides formed on respective substrates must be interconnected.

One of the most simplified coupling structures for connection between an optical waveguide and an optical fiber is such that an optical fiber is firmly adhered, as with an adhesive, in the optical-axis adjusted state to an optical waveguide substrate with the ends worked as mirror-surface. Another structure shown in FIG. 1 is in Japanese Laid-Open Patent No. Hei.3-50510 in which optical-fibers with one ends thereof worked into a lens-shape are located at a fixed distance from the one-ends of the optical guides and position-adjustment is made between them. For such connection structure it is needed to make the optical-axis alignment while monitoring the optical output so that the core of the optical fiber may be aligned with the core of the optical waveguide. It therefore has defects such as very poor productivity, misalignment due to change in ambient temperature and degradation with time as the result of merely bringing the optical fiber into face to face contact with the optical waveguide substrate and adhering with an adhesive, and the consequent low reliability.

A technique for removing the later-described defect is known, for example, from an article (Reference 1): C-186 of the Autumn (1992) Meeting proceedings of the Electronics/Information/Communication Institute, which consists of carrying out the optical-axis alignment of an optical fiber with an optical waveguide, followed by irradiation of of $CO_2$ laser at the ends of them contacted with each other to be fused together.

The technique described in reference 1 however is encountered in problems of requiring optical-axis alignment of the optical fiber, being essential for the optical waveguide substrate to be made from fusible glass, and resulting in a poor strength because of being the restricted area to be fused together and thus an insufficient reliability. It has another drawback of being impossible to be applied to connection between optical waveguides though application to connection between an optical waveguide and an optical fiber is possible.

To solve the defects of these conventional connection techniques that need the positional adjustment, a further structure was proposed which permits coupling between an optical fiber and an optical waveguide without need for the positional adjustment by means of forming a V-shaped groove on the substrate of the optical waveguide and placing the optical fiber on this V-shaped groove as shown in FIG. 2.

This structure however has a defect that does not allow connection between optical waveguides without adjustment. Notably for forming a large-scale optical integrated circuit, two or more connections between optical waveguides are needed, and this has been very difficult so far.

SUMMARY OF THE INVENTION

In view of the above-mentioned defects, the principal object of the present invention is to provide a simplified, high-reliable coupling structure allowing connection between optical waveguides or between an optical fiber and an optical waveguide without the need for the optical-axis alignment.

A coupling structure for optical-waveguide connection according to the present invention comprises a first optical waveguide formed on the surface of a first substrate, a tenon formed at the end of the first substrate, a second optical waveguide formed on the surface of a second substrate, and a groove formed at the end portion of the second substrate, the tenon of the first substrate being fitted into the groove.

Notably the first and second substrates are made from silicon, the tenon is formed into a triangle in cross-section by subjecting the first substrate to chemical anisotropic etching, and the groove is formed in to a V-shape in cross-section by subjecting the second substrate to chemical anisotropic etching. Another coupling structure for optical-waveguide connection to connect optically an optical waveguide formed on the surface of a first substrate and an optical fiber on the surface of the second substrate, a tenon protruding from the end of the substrate being fitted into a groove formed at the end portion of the second substrate to join the ends of the optical waveguide and the optical fiber for the connection.

An tenon is formed at the end of an substrate with one of the optical waveguides formed thereon and a groove is formed at the end of another substrate with the other optical waveguide formed thereon, thereby connection between optical waveguides being possible to be made by coupling between the tenon and groove. Also connection between an optical waveguide and an optical fiber is possible by placing the optical fiber in the groove instead of forming the optical waveguide on the grooved substrate.

Furthermore a plurality of optical waveguides and associated tenons are formed on a substrate and the same number of optical waveguides or optical fibers and associated grooves are formed on another substrate, and thus multiple connections between optical waveguides or between optical waveguides and optical fibers can be made by fitting the tenons into the corresponding grooves.

Such a tenon of triangle in cross-section as mentioned above can be formed at a good mass-production and at high precision by forming a mask pattern for leaving the tenon on the back of a silicon substrate with (100) plane as the crystal orientation of the surface thereof and subjecting chemical anisotropic etching. The mask pattern can be formed at a high precision by making use of photolithography used generally in the process of manufacturing semiconductor devices, and therefore the tenon and groove can be formed also at a high precision location. In this way, alignment between optical waveguides or between an optical waveguide and an optical fiber can be made at a high-precision without optical-axis alignment.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

For easy understanding of the present invention, to begin with, the prior-art coupling structure between an optical fiber and an optical waveguide will be set forth.

Figure 1:
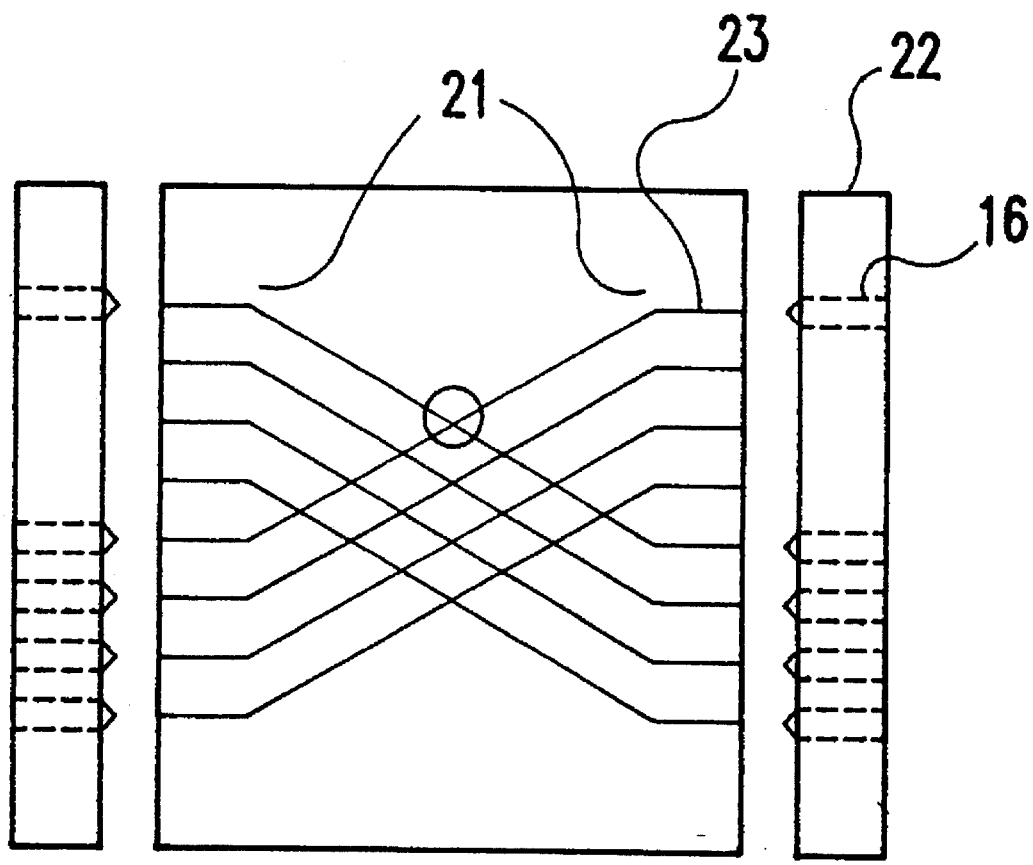
FIG. 1 is a perspective view of a prior-art technique for connection between optical waveguides and optical fibers.

Referring to FIG. 1, optical waveguides 23 are formed on the surface of a substrate 21 to build a matrix optical switch in the conventional example shown herein. On the other hand, optical fibers 1G are arranged on a substrate 22. Each optical fiber has at one end a spherical surface for getting a light-gathering effect. The substrate 22 is set to the optimum position adjusted for the optical fibers 16 to couple optically with corresponding optical waveguides. Substrate 21 is required to be precisely adjusted in three (horizontal, vertical and optical-axis) directions.

Figure 2:
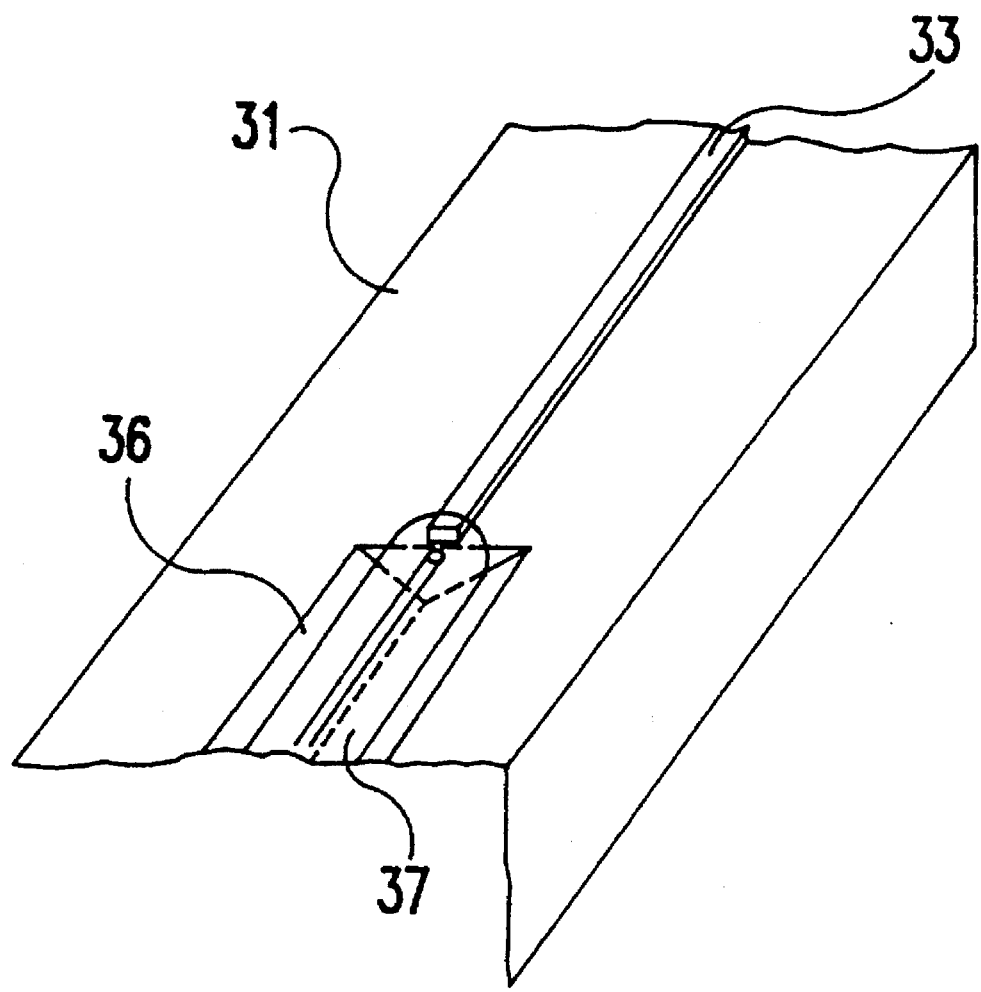
FIG. 2 is a perspective view of a prior-art coupling structure for connection between an optical waveguide and an optical fiber.

Referring to FIG. 2, on the surface of a substrate 31 an optical waveguide 33 runs and in its prolongation a V-shaped groove 36 is formed by chemical etching. Its depth is usually, set to be equal to such a height that with an optical fiber having a diameter of 125 μm placed therein, the center of its core may be agreed with the core of optical waveguide 33. Letting substrate 31 be made from silicon, this depth is controlled as desired if the surface direction is specified and the groove-width is previously set by the patterning because the etching is carried out at a specified angle. This coupling structure however cannot achieve connection between optical waveguides. The end of V-shaped groove 36 is formed obliquely, and this makes it impossible to bring the end of optical fiber 32 into tight contact with optical waveguide 33, therefore causing a problem increasing the loss at the coupling.

An embodiment of the present invention will be detailed with reference to the drawings.

Figure 3A:
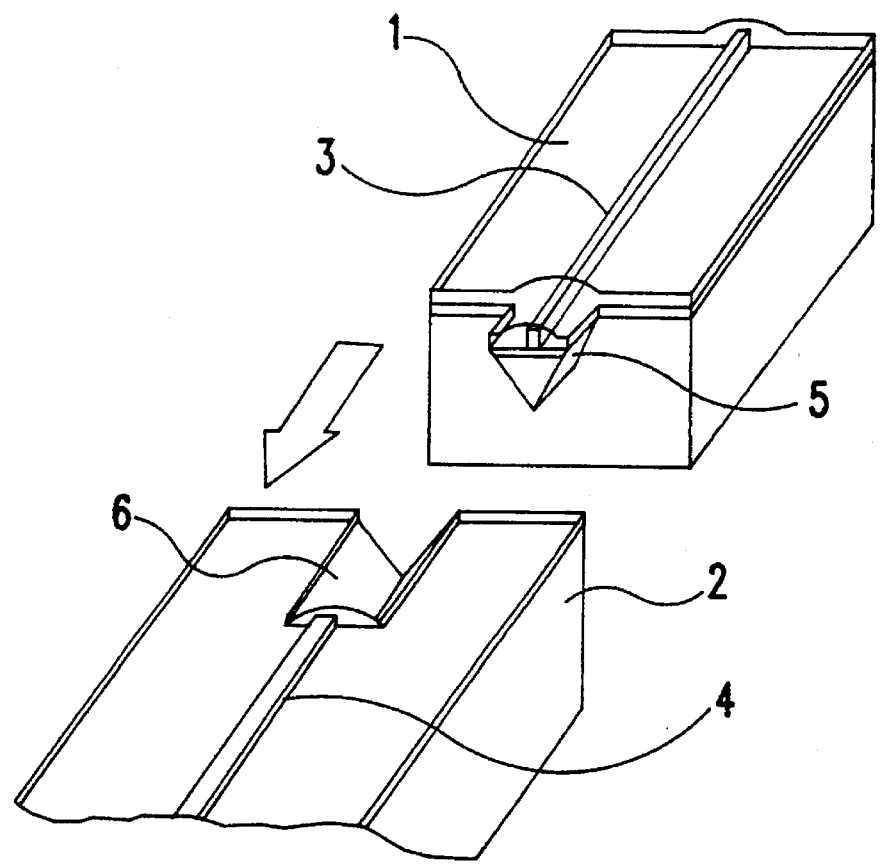
FIGS. 3(a) and 3(b) are perspective views uncoupled and coupled states, respectively, of an embodiment of coupling structure for connection between optical waveguides according to the present invention.
Figure 3B:
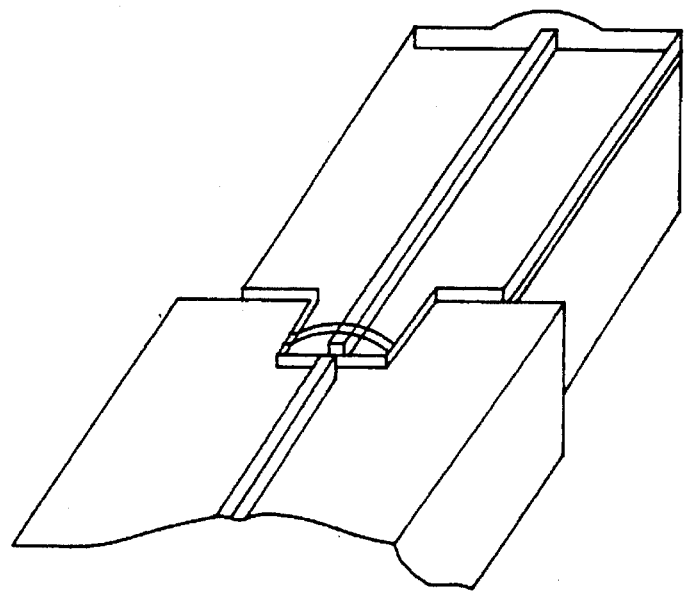

FIG. 3 is a perspective view for illustrating an embodiment of the coupling structure for optical waveguide according to the present invention. The first and second substrates are made from silicon and have thereon-formed optical waveguides 3, 4, respectively, which consists of silicon dioxide deposited by the chemical vapor deposition (CVD) technique on the first and second silicon substrates 1, 2. The respective cores are doped with germanium.

The first silicon substrate has a project or tenon 5 protruding from its end and having a triangle cross-section. The optical waveguide prolongs on the surface of the tenon. At the confronting end portion of the second silicon substrate a V-shaped groove 6 is formed as a mortise to align the center line thereof with the second optical waveguide. At the end of the second optical waveguide which is contiguous to the inner end of the V-shaped groove 6, only the surface of it is cut with a blade saw to be mirror-worked.

FIG. 3(a) shows the tenon of the first silicon substrate and the V-shaped groove 6 in an uncoupled relation between them. Since their cross-sections assume the same triangle of identical dimensions, tenon 5 is fitted into V-shaped groove 6 with the ends of the first and second optical waveguides 3 placed in direct contact with each other. Tenon 5 and V-shaped groove 6 are previously formed so that their center lines are aligned with optical waveguides 3 and 4, respectively. In virtue of this, the coupling can be performed with optical-axis alignment between the first and second waveguides 3, 4 without need for positional adjustment.

A coupling structure for connection between an optical waveguide and an optical fiber will be set forth below.

FIG. 4 illustrates another embodiment of applying the coupling structure for optical waveguides according to the present invention to connection between an optical waveguide and an optical fiber. The first silicon substrate 11 has an optical waveguide 13 formed in the same way as mentioned above and a tenon 15 on which the optical waveguide 13 prolongs. The second silicon substrate 12 is provided on its surface with as a mortise a V-shaped groove 16 in which an optical fiber with its end portion cut to be mirror-worked is placed and firmly adhered with a resin.

Figure 4A:
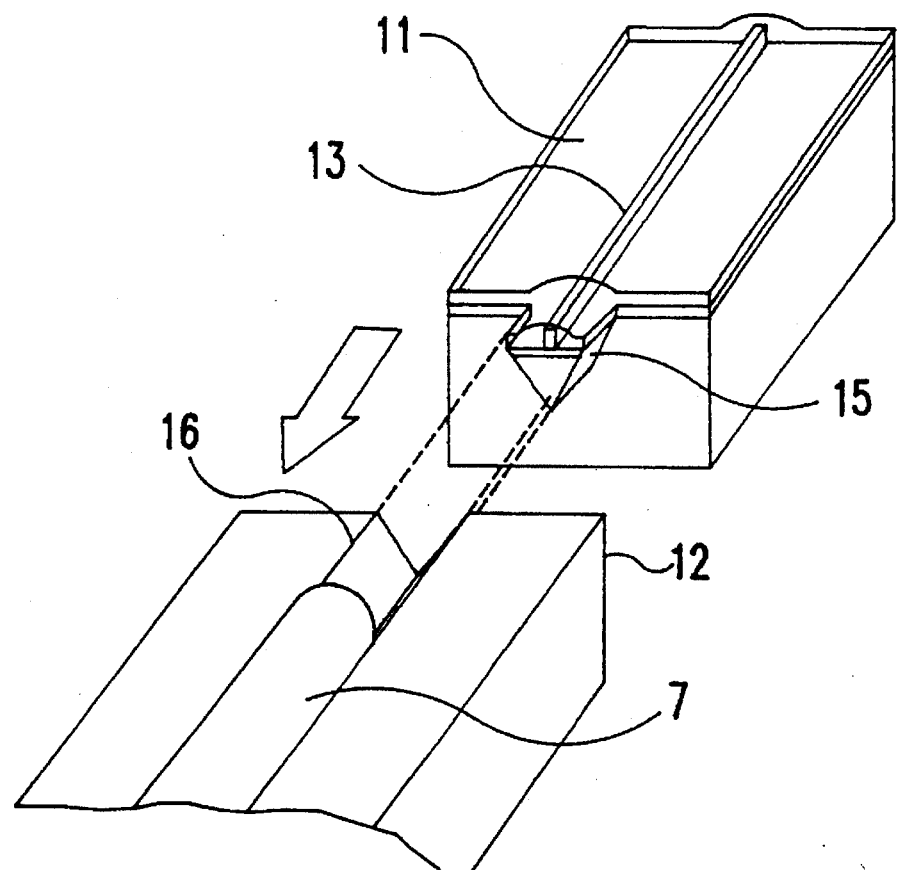
FIG. 4(a) and (b) are perspective views uncoupled and coupled, respectively, of another embodiment of coupling structure for connection between an optical waveguide and an optical fiber according to the present invention.
Figure 4B:
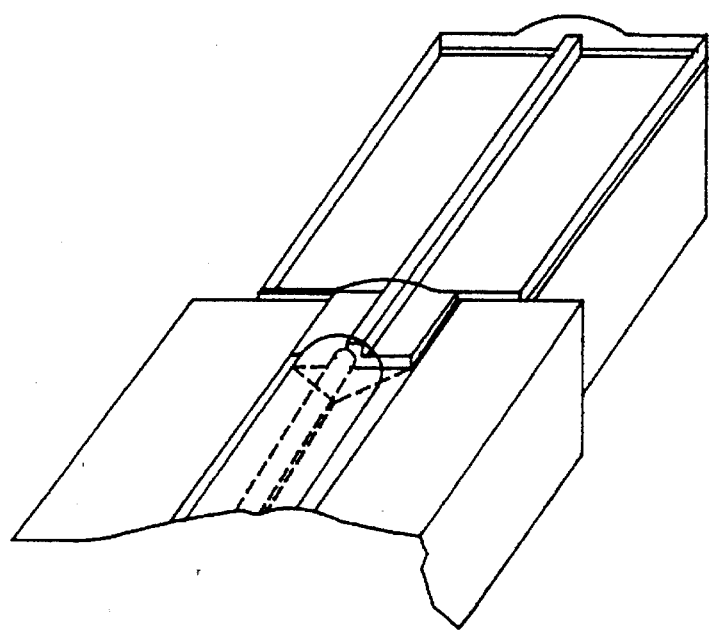

FIG. 4(a) illustrates the first and second substrates 1 1, 12 in an uncoupled relationship between them. Tenon 1 5 of the first silicon substrate 11 is well fitted into V-shaped groove 16 without need for optical-axis alignment. FIG. 4b illustrates the first and second substrates 11, 1 2 coupled to each other, securely adhered with a resin, with the ends of optical waveguide 13 and optical fiber 7 joined exactly to each other.

As described above, the coupling structure for optical-waveguide connection according to the present invention permits easy connection without need for optical-axis alignment between optical waveguides and between an optical waveguide and an optical fiber. Unlike the conventional coupling structure by which an optical fiber is adhered directly to the end surface of the optical waveguide, this coupling structure consists of a tenon and a groove formed on respective substrates, and the tenon is fitted into the groove to make the connection, and thereby an increased adherence area are secured and an increased reliability is obtained.

A process of forming the tenon of the first silicon substrate shown in FIGS. 3 and 4 will be set forth under.

FIG. 5 shows steps for forming the tenon of the first silicon substrate as one partner of the coupling structure. Herein a silicon substrate 8 with a crystal orientation (100) plane on the surface is used. As shown in FIG. 5(a), an oxide (SiO$_2$) film is grown by thermal oxidation over the back surface 30 of silicon substrate 8, and thereover a resist pattern is formed by photolithography to leave as the tenon before an optical waveguide 32 is formed on the substrate surface 31. In this circumstances, the oxide film is etched by a buffered fluoric acid to form, in the end portion of silicon substrate 8, a mask pattern 9 of oxide film for leaving the tenon 25.

Figure 5A:
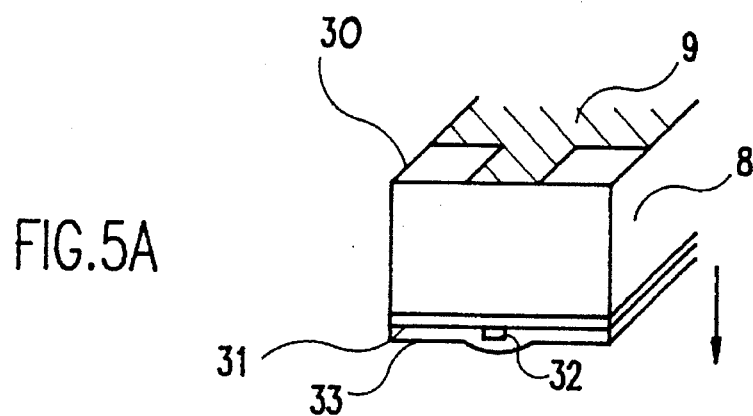
FIGS. 5(a) to (d) are perspective views of processing steps of forming a coupling project in the substrate of an optical waveguide according to the present invention.
Figure 5B:
Figure 5C:
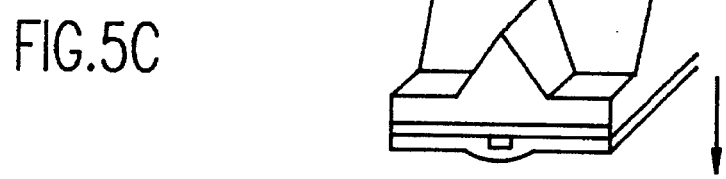
Figure 5D:
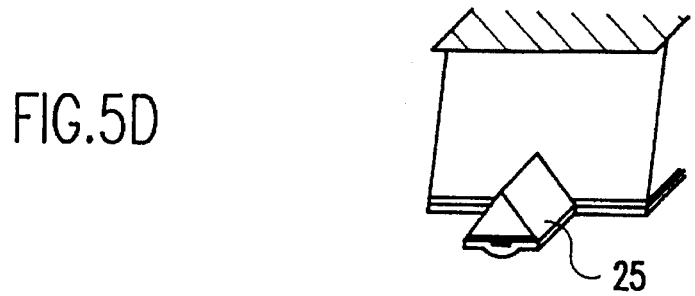

Referring to FIG. 5(b), silicon substrate 8, after forming optical waveguide 32 on its surface 31, is dipped in an etch using as an etchant generally such as potassium hydroxide solution or hydrazine. Silicon substrate 8 takes (100) plane as crystal orientation and hence the obligated side of crystal orientation (111) plane at 54.74 degrees is formed. In this case, since the entire surface 31 of silicon substrate 8 is covered with oxide film formed as cladding layer 33 of optical waveguide 32, etching is stopped by the substrate surface 31. In this situation, further etching results in side-etching under the oxide film mask pattern 9 to form tenon 25 of triangle in cross-section. The etching proceeds until the height of this end surface becomes equal to the depth of V-shaped groove as mortise. By these steps, tenon 25 projecting from the end of silicon substrate 8 can be formed. This etching is carried out with good reproducibility by controlling temperature and etch time and hence also the height of the cross-section can be formed at a high precision. Furthermore all of thermal oxidation, patterning, and etching can be performed in similar process to the process of manufacturing semiconductor devices, and therefore mass-production is possible.

On the other hand, to form a V-shaped groove in the second substrate, an oxide-film mask pattern from which the area corresponding to the V-shaped groove has been removed may be formed on the substrate surface, followed by being etched in the same way as described above. In this case, by agreeing the width of the mask pattern with that of the first substrate, the core of the optical fiber can be aligned with the core of the optical waveguide.

As described above, the coupling structure for connection of waveguides on respective substrates consists of a tenon of one substrate and a groove at the end portion of the other substrate into which the tenon is fitted to make connection. In virtue of this coupling structure, a simplified, high-reliable connection can be implemented without opical-axis adjustment. The tenon and groove can be formed on respective silicon substrates by a chemical anisotropic etching at a high precision in batch process, and thus superior in mass-production.

Figure 6:
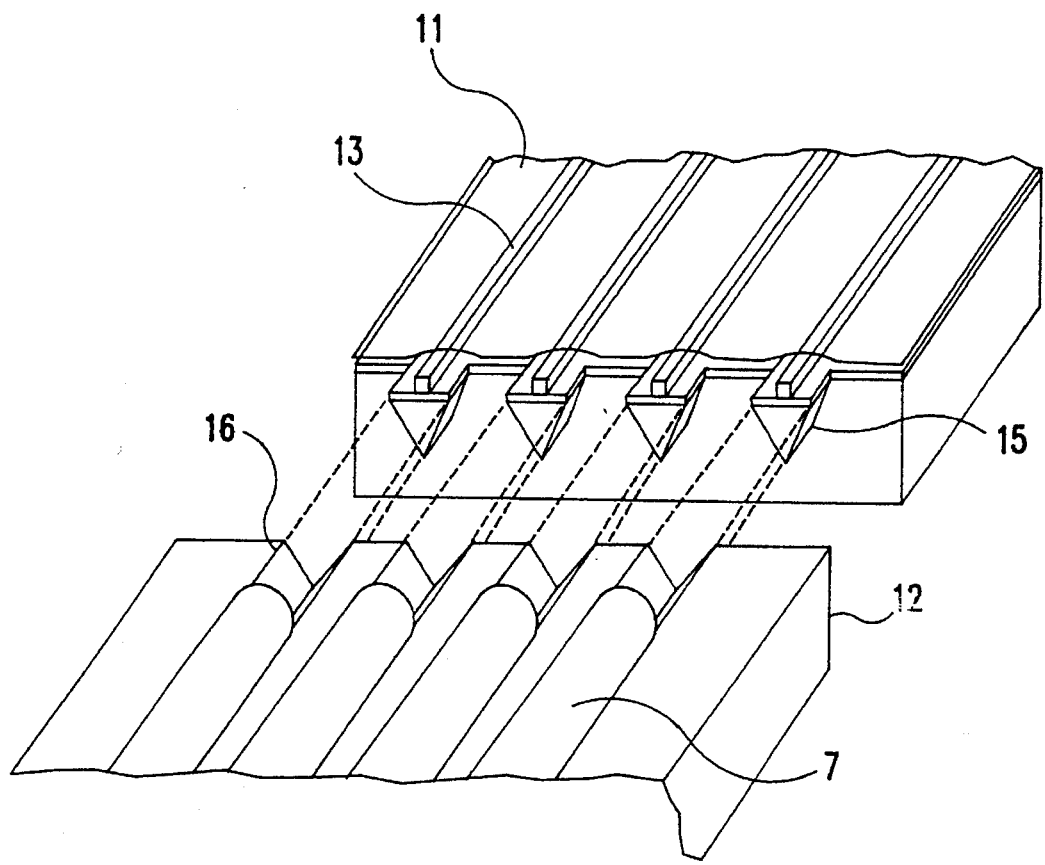
FIG. 6 is a perspective view for illustrating an embodiment of making the coupling by the coupling structure according to the present invention between a plurality of optical waveguides and a plurality of optical fibers.

Finally in this embodiment, for easy understanding of the present invention, a single optical-waveguide connection has been described above. This however is not to be considered as limiting the invention but can be applied to multiple optical-waveguide connection as illustrated in FIG. 6. Whereby connection between optical waveguides or between optical waveguides and optical fibers in a waveguide-type optical switch or a star coupler can be accomplished more easily and at a higher reliability.

What is claimed is:

1. A coupling structure for an optical-waveguide connection, comprising:

a first optical waveguide positioned on a surface of a first substrate;

a tenon positioned at an end portion of said first substrate;

a second optical waveguide positioned on a surface of a second substrate; and a groove formed at an end portion of said second substrate, said tenon for fitting into said groove, wherein said first substrate and second substrate comprise silicon substrates, and a cross-section of said groove having a V-shape with a vertical angle and a cross-section of said tenon having a triangular shape with said vertical angle.

2. A coupling structure for an optical-waveguide connection according to claim 1, wherein;

said tenon is formed by subjecting said first substrate to chemical anisotropic etching; and said groove is formed by subjecting said second substrate to chemical anisotropic etching.

3. A coupling structure for an optical-waveguide connection according to claim 1, further comprising:

a plurality of optical waveguides positioned on said first substrate;

a plurality of optical waveguides positioned on said second substrate, wherein said optical waveguides on said first substrate are connected to corresponding ones of said optical waveguides on said second substrate.

4. A coupling structure for an optical-waveguide connection comprising:

an optical waveguide positioned on a surface of a first substrate;

a tenon positioned at an end of said first substrate along said optical waveguide;

a groove formed on a surface of a second substrate, said tenon for fitting into said groove; and an optical fiber positioned in said groove, wherein said first substrate and second substrate comprise silicon substrates, and a cross-section of said groove having a V-shape with a vertical angle and a cross-section of said tenon having a triangular shape with said vertical angle.

5. A coupling structure for an optical-waveguide connection according to claim 4, wherein;

said tenon is formed by subjecting said first substrate to chemical anisotropic etching; and said groove is formed by subjecting said second substrate to chemical anisotropic etching.

6. A coupling structure for an optical-waveguide connection according to claim 4, further comprising:

a plurality of optical waveguides formed on said first substrate;

a plurality of grooves positioned on said second substrate; and a plurality of optical fibers, at least one optical fiber of said plurality of optical fibers being positioned in each groove, wherein said optical waveguides are connected to corresponding ones of said optical fibers.

7. A coupling structure for an optical-waveguide connection, comprising:

a first optical waveguide positioned on a surface of a first substrate;

a tenon positioned on a surface of said first substrate;

a second optical waveguide positioned on a surface of a second substrate; and a groove formed at an end portion of said second substrate, wherein said first substrate and second substrate comprise silicon substrates, and a cross-section of said groove having a V-shape and a vertical angle and a cross-section of said tenon having a trapezoidal shape with said vertical angle.

8. A coupling structure for an optical-waveguide connection according to claim 7, wherein:

said tenon is formed by subjecting said first substrate to chemical anisotropic etching; and said groove is formed by subjecting said second substrate to chemical anisotropic etching.

9. A coupling structure for an optical-waveguide connection according to claim 7, further comprising:

a plurality of optical waveguides positioned on said first substrate; and a plurality of optical waveguides positioned on said second substrate;

wherein said optical waveguides on said first substrate are connected to corresponding ones of said optical waveguides on said second substrate.

10. A coupling structure for an optical-waveguide connection, comprising:

an optical waveguide positioned on a surface of a first substrate;

a tenon positioned at an end of said first substrate along said optical waveguide;

a groove formed on a surface of a second substrate, said tenon for fitting into said groove; and an optical fiber positioned in said groove, wherein said first substrate and second substrate comprise silicon substrates, and a cross-section of said groove having a V-shape with a vertical angle and a cross-section of said tenon having a trapezoidal shape with said vertical angle.

11. A coupling structure for an optical-waveguide connection according to claim 10, wherein:

said tenon is formed by subjecting said first substrate to chemical anisotropic etching; and said groove is formed by subjecting said second substrate to chemical anisotropic etching.

12. A coupling structure for an optical-waveguide connection according to claim 10, further comprising:

a plurality of optical waveguides positioned on said first substrate;

a plurality of grooves formed on said second substrate; and a plurality of optical fibers, at least one optical fiber of said plurality of optical fibers being positioned in each groove, wherein said optical waveguides are connected to corresponding ones of said optical fibers.

* * * * *